United States Patent
Kroeger

(10) Patent No.: US 7,340,010 B2
(45) Date of Patent: Mar. 4, 2008

(54) FORWARD ERROR CORRECTION CODING FOR HYBRID AM IN-BAND ON-CHANNEL DIGITAL AUDIO BROADCASTING SYSTEMS

(75) Inventor: Brian William Kroeger, Sykesville, MD (US)

(73) Assignee: iBiquity Digital Corporation, Columbia, MD (US)

( * ) Notice: Subject to any disclaimer, the term of this patent is extended or adjusted under 35 U.S.C. 154(b) by 698 days.

(21) Appl. No.: 10/764,629

(22) Filed: Jan. 26, 2004

(65) Prior Publication Data

US 2005/0163256 A1 Jul. 28, 2005

(51) Int. Cl.
*H03C 1/52* (2006.01)
(52) U.S. Cl. .................. 375/300; 375/265; 375/268; 375/270; 375/320; 375/316; 714/786; 714/792; 714/790; 714/796
(58) Field of Classification Search ................ 375/265, 375/268, 270, 300, 295, 316, 320; 370/527–529, 370/487, 206; 714/786, 788, 792, 796, 795; 455/61, 108, 132, 202–206
See application file for complete search history.

(56) References Cited

U.S. PATENT DOCUMENTS

| | | | |
|---|---|---|---|
| 5,588,022 A | 12/1996 | Dapper et al. | |
| 6,005,894 A | 12/1999 | Kumar | |
| 6,108,810 A | 8/2000 | Kroeger et al. | |
| 6,229,824 B1 | 5/2001 | Marko | |
| 6,243,424 B1 | 6/2001 | Kroeger et al. | |
| 6,345,377 B1 | 2/2002 | Kroeger et al. | |
| 6,347,122 B1 | 2/2002 | Chen et al. | |
| 6,351,500 B2 | 2/2002 | Kumar | |
| 6,430,227 B1 | 8/2002 | Kroeger et al. | |
| 6,430,401 B1 | 8/2002 | Lou et al. | |
| 6,445,693 B1* | 9/2002 | Sarraf et al. | ................ 370/343 |
| 6,445,750 B1 | 9/2002 | Chen et al. | |

(Continued)

FOREIGN PATENT DOCUMENTS

EP 0991221 A2 4/2000

(Continued)

OTHER PUBLICATIONS

B. Chen et al., "Complementary Punctured-Pair Convolutional Codes for Digital Audio Broadcasting," *IEEE Transactions on Communications*, vol. 48, No. 11, Nov. 2000, pp. 1829-1839.

(Continued)

*Primary Examiner*—David C. Payne
*Assistant Examiner*—Rahel Guarino
(74) *Attorney, Agent, or Firm*—Robert P. Lenart, Esq.; Pietragallo Gordon Alfano Bosick & Raspanti, LLP

(57) ABSTRACT

An AM compatible digital audio broadcasting signal comprises an analog modulated carrier signal centrally positioned in a radio channel, wherein the analog modulated carrier signal is modulated by an analog signal, and a plurality of digitally modulated subcarrier signals in the radio channel, wherein the digitally modulated subcarrier signals are modulated using complementary pattern-mapped trellis code modulation including a code mapped to overlapping partitions. Time diversity can be included between the analog modulated carrier signal and the plurality of digitally modulated subcarrier signals, and/or between groups of the digitally modulated subcarrier signals. A broadcasting method, and transmitters and receivers and that utilize the signal are also provided.

17 Claims, 6 Drawing Sheets

U.S. PATENT DOCUMENTS

| | | | |
|---|---|---|---|
| 6,487,256 B2 * | 11/2002 | Kroeger et al. | ............ 375/265 |
| 6,523,147 B1 | 2/2003 | Kroeger et al. | |
| 6,603,826 B1 | 8/2003 | Cupo et al. | |
| 7,043,681 B2 | 5/2006 | Kroeger | |
| 2001/0021231 A1 | 9/2001 | Kroeger et al. | |
| 2002/0039389 A1 | 4/2002 | Chen et al. | |
| 2003/0108123 A1 | 6/2003 | Kroeger et al. | |

FOREIGN PATENT DOCUMENTS

| | | |
|---|---|---|
| EP | 1014590 A2 | 6/2000 |
| EP | 1059748 A2 | 12/2000 |
| EP | 1109344 A2 | 6/2001 |

OTHER PUBLICATIONS

J. N. Laneman et al., "Soft Selection Combining for Terrestrial Digital Audio Broadcasting in the FM Band," *IEEE Transactions on Broadcasting*, vol. 47, No. 2, Jun. 2001, pp. 103-114.

\* cited by examiner

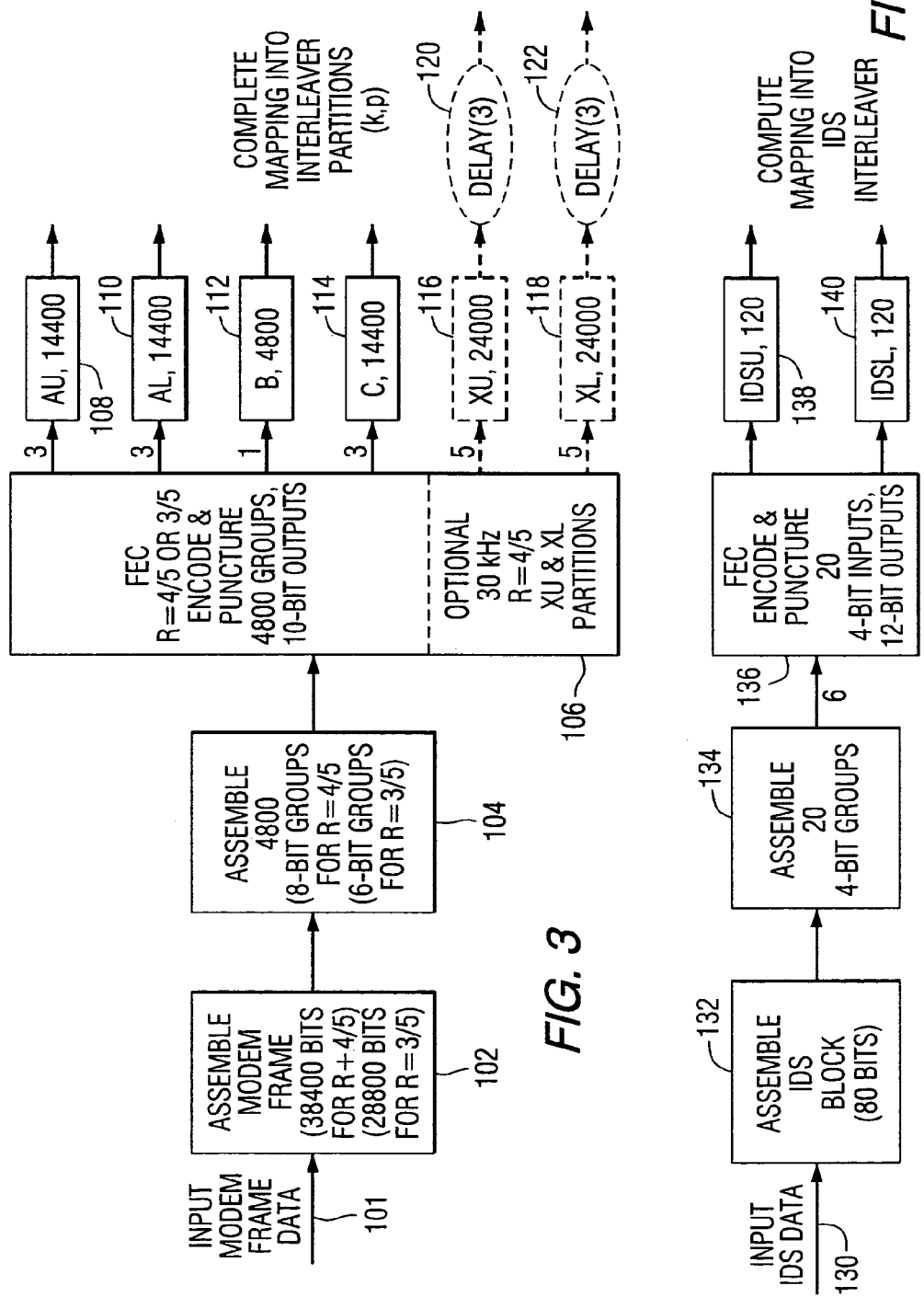

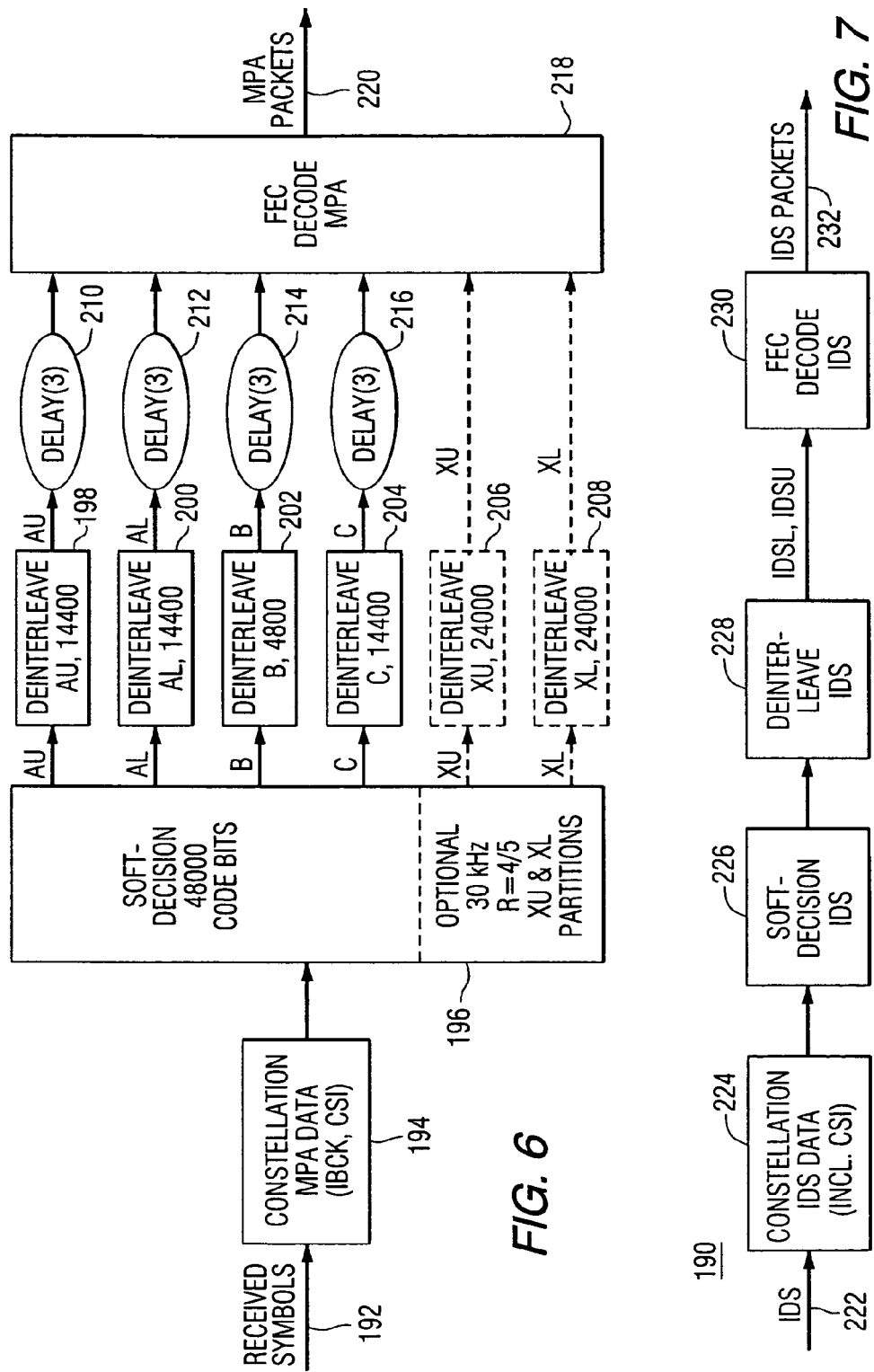

FORWARD ERROR CORRECTION CODING FOR HYBRID AM IN-BAND ON-CHANNEL DIGITAL AUDIO BROADCASTING SYSTEMS

FIELD OF THE INVENTION

This invention relates to methods and apparatus for digital audio broadcasting, and more particularly to such methods and apparatus for broadcasting AM compatible in-band on-channel (IBOC) digital audio broadcasting (DAB) signals.

BACKGROUND OF THE INVENTION

Digital audio broadcasting (DAB) is a medium for providing digital-quality audio, superior to existing analog broadcasting formats. AM in-band, on-channel (IBOC) DAB can be transmitted in a hybrid format where a digitally modulated signal coexists with the AM signal, or it can be transmitted in an all-digital format where the removal of the analog signal enables improved digital coverage with reduced interference. The hybrid format allows existing receivers to continue to receive the AM signal while allowing new IBOC receivers to decode the DAB signal. IBOC DAB requires no new spectral allocations because each DAB signal is simultaneously transmitted within the spectral mask of an existing AM channel allocation. IBOC DAB promotes economy of spectrum while enabling broadcasters to supply digital quality audio to their present base of listeners.

U.S. Pat. No. 5,588,022 teaches a method for simultaneously broadcasting analog and digital signals in a standard AM broadcasting channel. The DAB signal comprises an amplitude modulated radio frequency signal including a first subcarrier modulated by an analog program signal and having a first frequency spectrum, and a plurality of digitally modulated subcarrier signals that are broadcast within a bandwidth that encompasses the first frequency spectrum. The digitally modulated subcarrier signals are modulated by a digital program signal. A first group of the digitally modulated subcarrier signals lies within the first frequency spectrum and is modulated in quadrature with the first subcarrier signal. Second and third groups of the digitally modulated subcarrier signals lie outside of the first frequency spectrum and are modulated both in-phase and in-quadrature with the first subcarrier signal. U.S. Pat. No. 6,243,424 discloses another embodiment of an AM Digital Audio Broadcasting system.

A method and apparatus for forward error correction coding for an AM in-band on-channel (IBOC) digital audio broadcasting (DAB) system is described in U.S. Pat. No. 6,523,147, the disclosure of which is hereby incorporated by reference. A digital audio broadcasting method using puncturable convolutional code is described in U.S. Pat. Nos. 6,108,810 and 6,345,377, the disclosures of which are hereby incorporated by reference.

The present invention seeks to provide an AM IBOC DAB signal that can accommodate various interference scenarios as well as transmitters and receivers that utilize the signal.

SUMMARY OF THE INVENTION

An AM compatible digital audio broadcasting signal comprises an analog modulated carrier signal centrally positioned in a radio channel, wherein the analog modulated carrier signal is modulated by an analog signal, and a plurality of digitally modulated subcarrier signals in the radio channel, wherein the digitally modulated subcarrier signals are modulated using complementary pattern-mapped trellis code modulation (CPTCM) including a code mapped to overlapping partitions. The code is a complementary punctured convolutional code.

The analog modulated carrier signal and the plurality of digitally modulated subcarrier signals can be in a 20 kHz channel and the analog modulated signal is delayed for diversity purposes with respect to the plurality of digitally modulated subcarrier signals at the transmitter output. The receiver delays the digital signal such that the analog and digital audio outputs are aligned at the receiver audio output.

Alternatively, the analog modulated carrier signal and the plurality of digitally modulated subcarrier signals can be in a 30 kHz channel, wherein a first group of the plurality of digitally modulated subcarrier signals is delayed with respect to a second group of the plurality of digitally modulated subcarrier signals.

In another aspect, the invention encompasses a transmitter for broadcasting an AM compatible digital audio broadcasting signal, the transmitter comprising: means for producing an analog modulated carrier signal centrally positioned in a radio channel, wherein the analog modulated carrier signal is modulated by an analog signal; means for producing a plurality of digitally modulated subcarrier signals in the radio channel, wherein the digitally modulated subcarrier signals are modulated using complementary pattern-mapped trellis code modulation (CPTCM) including a code mapped to overlapping partitions; and means for broadcasting the analog modulated carrier signal and the plurality of digitally modulated subcarrier signals.

The invention also encompasses receivers for receiving an AM compatible digital audio broadcasting signal, the receivers comprising: an antenna for receiving a composite signal comprising an analog modulated carrier signal centrally positioned in a radio channel, wherein the analog modulated carrier signal is modulated by an analog signal, and a plurality of digitally modulated subcarrier signals in the radio channel, wherein the digitally modulated subcarrier signals are modulated using complementary pattern-mapped trellis code modulation (CPTCM) including a code mapped to overlapping partitions; and means for producing an output in response to the composite signal.

In another aspect, the invention provides an AM compatible digital audio broadcasting signal, the signal comprising: an analog modulated carrier signal centrally positioned in a radio channel, wherein the analog modulated carrier signal is modulated by an analog signal; a first plurality of subcarrier signals in a first portion of the radio channel and a second plurality of subcarrier signals in a second portion of the radio channel, wherein the first and second pluralities of subcarrier signals are complementary modulated subcarrier signals and have a power spectral density below the analog modulated carrier by a first margin; a third plurality of subcarrier signals in a third portion of the radio channel and a fourth plurality of subcarrier signals in a fourth portion of the radio channel, wherein the third and fourth pluralities of subcarrier signals are complementary modulated subcarrier signals and have a power spectral density below the analog modulated carrier by a second margin; and a fifth plurality of subcarrier signals in a fifth portion of the radio channel and a sixth plurality of subcarrier signals in a sixth portion of the radio channel, wherein the fifth and sixth pluralities of subcarrier signals have a power spectral density below the analog modulated carrier by a third margin; wherein the first, second, third, fourth, fifth and sixth pluralities of subcarrier signals are modulated by one or more digital signals, the first margin is larger than the second margin, and the second margin is larger than the third margin.

A 30 kHz version can further include a seventh plurality of subcarrier signals in a seventh portion of the radio channel and an eighth plurality of subcarrier signals in an eighth portion of the radio channel, wherein the seventh and eighth pluralities of subcarrier signals have a power spectral density below the analog modulated carrier by the third margin; and wherein the seventh and eighth pluralities of subcarrier signals are modulated by the one or more digital signals.

The invention further encompasses a method of broadcasting an AM compatible digital audio broadcasting signal, the method comprising the steps of: producing an analog modulated carrier signal centrally positioned in a radio channel, wherein the analog modulated carrier signal is modulated by an analog signal; producing a plurality of digitally modulated subcarrier signals in the radio channel, wherein the digitally modulated subcarrier signals are modulated using complementary pattern-mapped trellis code modulation (CPTCM) including a code mapped to overlapping partitions; and transmitting the analog modulated carrier signal and the plurality of digitally modulated subcarrier signals.

The analog modulated carrier signal and the plurality of digitally modulated subcarrier signals can be in a 30 kHz channel, and the method can further comprise the step of: eliminating or suppressing the subcarriers in an upper partition of subcarriers, or the subcarriers in a lower partition of subcarriers, or the subcarriers in both the upper partition of subcarriers and the lower partition of subcarriers depending upon interference conditions.

BRIEF DESCRIPTION OF THE DRAWINGS

FIG. 3 is a block diagram illustrating the functionality of forward error correction (FEC) and interleaving for a 20 or 30 kHz AM IBOC system.

FIG. 4 is a block diagram illustrating the functionality of IBOC data service (IDS) channel FEC and interleaving for a 20 or 30 kHz AM IBOC system.

FIG. 6 is a block diagram illustrating the functionality of a deinterleaver and FEC decoder for a 20 or 30 kHz AM IBOC system.

FIG. 7 is a block diagram illustrating the functionality of IDS channel deinterleaver and FEC decoder for a 20 or 30 kHz AM IBOC system.

DETAILED DESCRIPTION OF THE INVENTION

Figure 1:
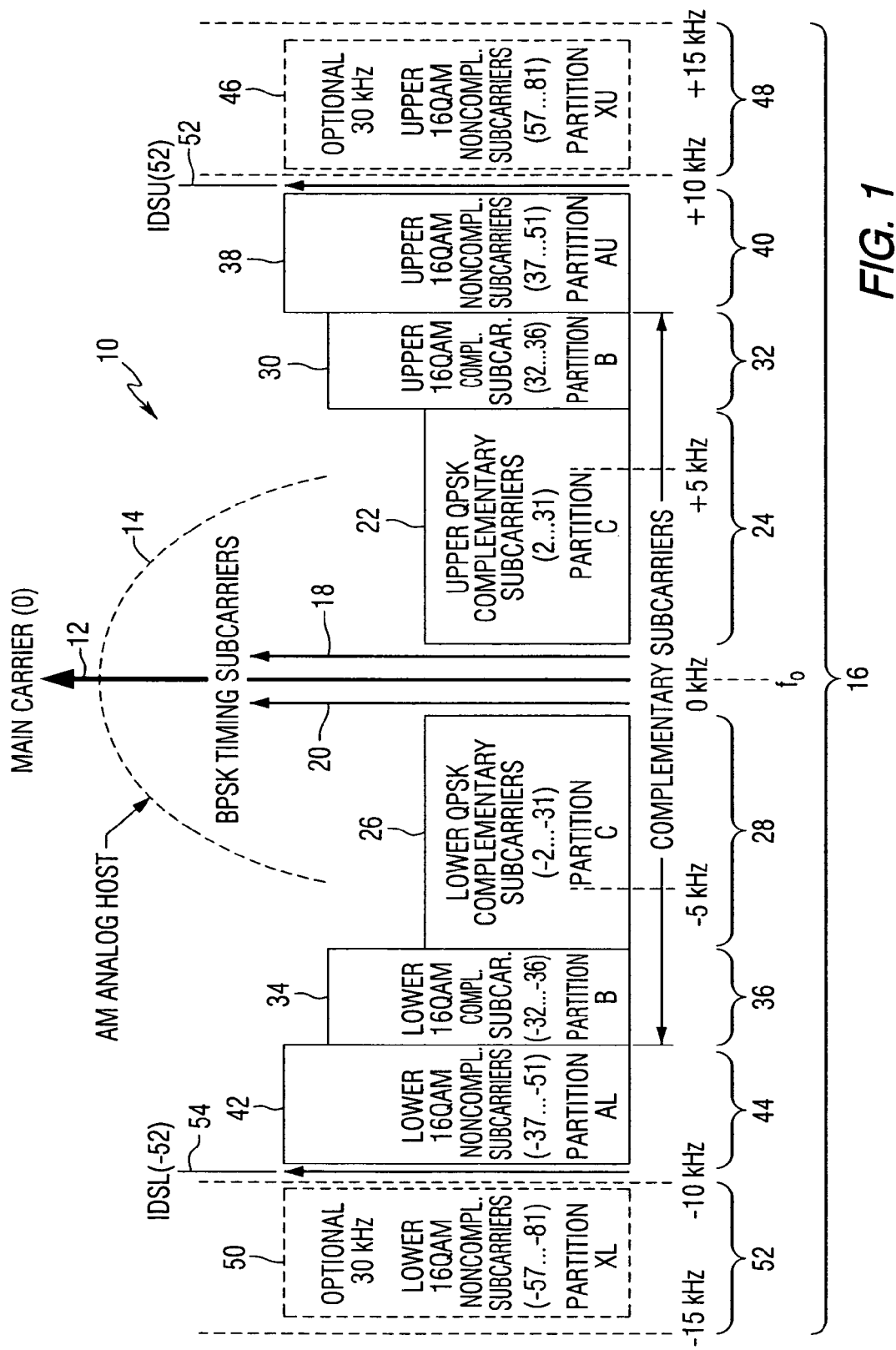
FIG. 1 is a schematic representation of partition and subcarrier assignments for a hybrid AM IBOC DAB signal in accordance with this invention.

This invention provides a single stream hybrid AM IBOC DAB system having a 20 or 30 kHz bandwidth and 25 and 19 kbps modes. The system broadcasts a waveform including an analog modulated carrier and a plurality of digitally modulated subcarriers in the same channel as the analog modulated carrier. The digital signal is divided into several partitions, which are mapped to groups of the subcarriers. Referring to the drawings, FIG. 1 is a schematic representation of the partition and subcarrier assignments for a hybrid 20 or 30 kHz AM IBOC signal.

The signal 10 includes an analog modulated carrier signal 12 that is modulated by an analog signal, resulting in an AM host signal generally indicated by line 14. The signal further includes a plurality of subcarriers at evenly spaced positions (numbered −81 to +81, and spanning a bandwidth of about 30 kHz) in the radio channel 16. BPSK modulated timing subcarriers 18 and 20 are located at the subcarrier positions +1 and −1, closest to the analog modulated carrier. A first plurality of subcarrier signals 22 are located at positions 2 through 31 in a first portion 24 of the radio channel and a second plurality of subcarrier signals 26 are located at positions −2 through −31 in a second portion 28 of the radio channel. The first and second pluralities of subcarrier signals are complementary modulated QPSK subcarrier signals and have a power spectral density below the analog modulated carrier by at least a first margin.

A third plurality of subcarrier signals 30 are located at positions 32 through 36 in a third portion 32 of the radio channel and a fourth plurality of subcarrier signals 34 are located at positions −32 through −36 in a fourth portion 36 of the radio channel. The third and fourth pluralities of subcarrier signals are complementary modulated 16-QAM subcarrier signals and have a power spectral density below the analog modulated carrier by at least a second margin. Complementary modulated subcarriers in the lower sideband groups 26 and 34 are modulated as the mirror image (negative complex conjugate) of corresponding subcarriers in the upper sideband groups 22 and 30.

A fifth plurality of subcarrier signals 38 are located at positions 37 through 51 in a fifth portion 40 of the radio channel and a sixth plurality of subcarrier signals 42 are located at positions −37 through −51 in a sixth portion 44 of the radio channel. The fifth and sixth pluralities of subcarrier signals are 16-QAM modulated signals and have a power spectral density below the analog modulated carrier by at least a third margin. In one embodiment, the first margin is 50 dBc, the second margin is 43 dBc, and the third margin is 40 dBc.

The first, second, third, fourth, fifth and sixth pluralities of subcarrier signals are modulated by one or more digital signals. The digital signals can include a digital version of a program signal used to modulate the analog modulated carrier, as well as other digital signals.

An optional seventh plurality of subcarrier signals 46 can be located at positions 57 through 81 in a seventh portion 48 of the radio channel and an optional eighth plurality of subcarrier signals 50 can be located at positions −57 through −81 in an eighth portion 44 of the radio channel. The seventh and eighth pluralities of subcarrier signals are 16-QAM modulated signals and have a power spectral density below the analog modulated carrier by at least the third margin. The subcarriers in the fifth, sixth, seventh and eighth portions of the channel are not complementary modulated.

An IBOC Data Service (IDS) subcarrier 52 is located at position 52 between the fifth and seventh pluralities of subcarriers, and an IBOC Data Service subcarrier 54 is located at a position −52 between the sixth and eighth pluralities of subcarriers. In one embodiment, the IBOC Data Service subcarriers have a power spectral density at least 40 dBc below the analog modulated carrier. The subcarriers at locations 53-56 are omitted because of first adjacent channel interference.

The AM IBOC DAB signal subcarriers are digitally modulated using COFDM (Coded Orthogonal Frequency Division Multiplexing). Each of the subcarriers is modulated using 16-QAM, QPSK or BPSK (subcarriers ±1 only) symbols. The digital information (e.g. audio) is forward error corrected (FEC) coded using complementary pattern-mapped trellis coded modulation (CPTCM), and then separated into partitions that are interleaved separately. The CPTCM method of FEC for the AM IBOC is based upon a combination of a code pattern-mapping technique described below, and the application of overlapping Complementary Puncture Codes to AM IBOC system.

The partitions are identified by letters in FIG. 1. The digital information in partition C is used to modulate the first and second pluralities of subcarriers. The digital information in partition B is used to modulate the third and fourth pluralities of subcarriers. The digital information in partition AU is used to modulate the fifth plurality of subcarriers. The digital information in partition AL is used to modulate the sixth plurality of subcarriers. The digital information in partition XU is used to modulate the seventh plurality of subcarriers. The digital information in partition XL is used to modulate the eighth plurality of subcarriers. The partitions are mapped to subcarriers at particular power levels to minimize both host interference and interference to adjacent channels, while attempting to maximize coverage. Different interference scenarios will cause corruption to different partitions. The goal of the CPTCM coding and grouping into these partitions is to maximize coverage while minimizing interference.

The basic requirements for the CPTCM code include the ability to puncture the original code and map the code bits to the symbols in a manner that provides superior coding gain over a random mapping of the code bits. The CPTCM code must further include the ability to puncture the original code in various overlapping partitions including Main, Backup, Lower Sideband and Upper Sideband. Each of the overlapping partitions must survive as a good code as designed for typical interference and AM channel conditions. Partitions AL, AU, B and C form the Main component, while the optional XL and XU partitions form the Backup which is time diverse from Main. Furthermore, the lower AL and XL partitions can be completely corrupted while the AU and XU partitions can carry the signal. Similarly, the upper AU and XU partitions can be completely corrupted while the AL and XL partitions can carry the signal. The inner B and C partitions add coding gain to the A and X partitions. Various levels of corruption can be tolerated in likely interference scenarios.

Figure 2:
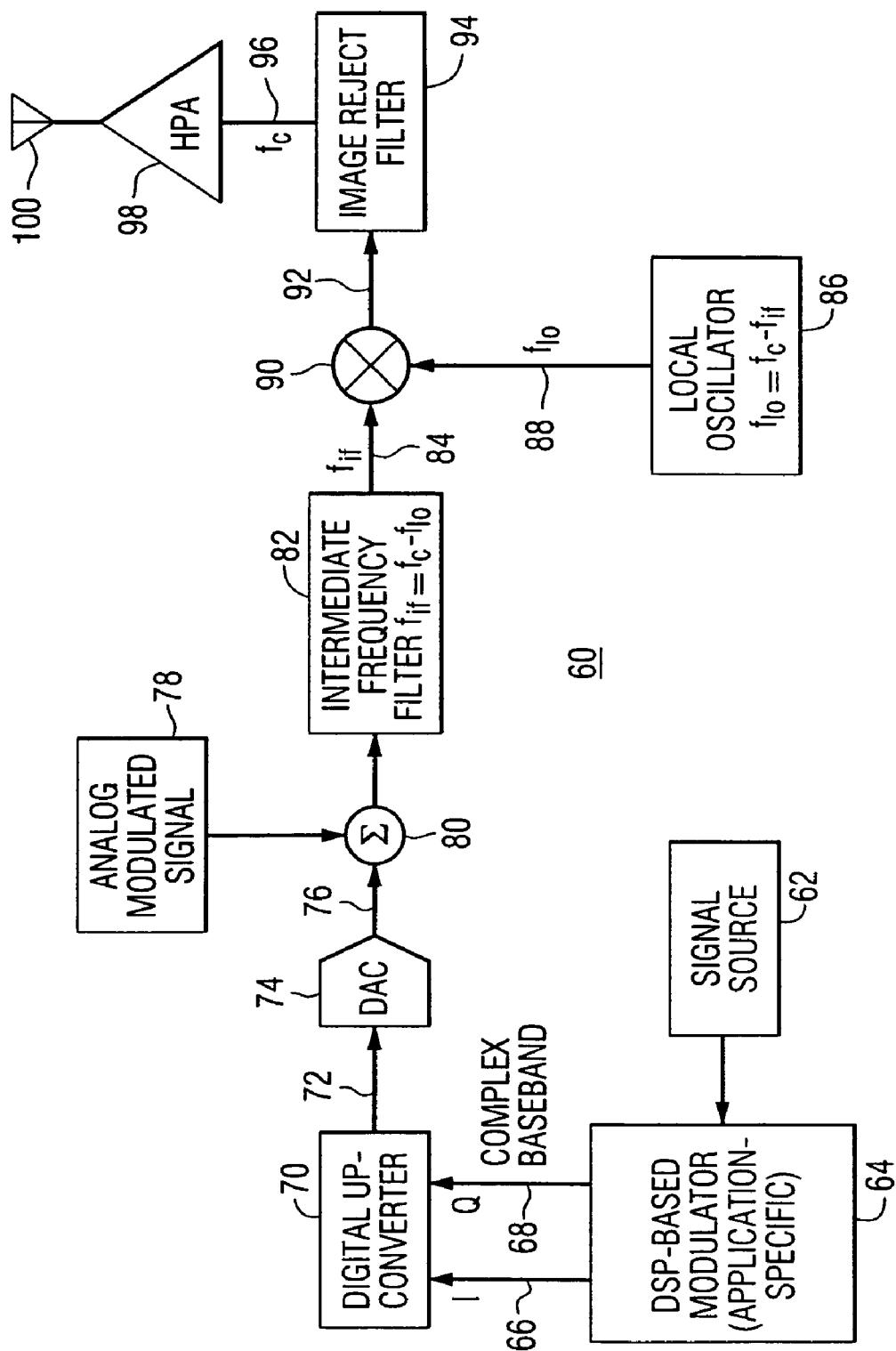
FIG. 2 is a functional block diagram of an AM IBOC DAB transmitter constructed in accordance with this invention.

FIG. 2 is a block diagram of a DAB transmitter 60 that can broadcast digital audio broadcasting signals in accordance with the present invention. A signal source 62 provides the signal to be transmitted. The source signal may take many forms, for example, an analog program signal and a digital program signal, and/or one or more other digital information signals. A digital signal processor (DSP) based modulator 64 processes the source signal in accordance with various signal processing techniques, such as source coding, interleaving and forward error correction, to produce in-phase and quadrature components of the complex base band signal on lines 66 and 68. These components are shifted up in frequency, filtered and interpolated to a higher sampling rate in up-converter block 70. This produces digital samples at a rate $f_s$, on intermediate frequency signal $f_{if}$ on line 72. Digital-to-analog converter 74 converts the signal to a plurality of digitally modulated subcarriers on line 76. The digitally modulated subcarriers are combined with an analog modulated signal 78 as illustrated by summation point 80. An intermediate frequency filter 82 rejects alias frequencies to produce the intermediate frequency signal $f_{if}$ on line 84. A local oscillator 86 produces a signal $f_{lo}$ on line 88, which is mixed with the intermediate frequency signal on line 84 by mixer 90 to produce sum and difference signals on line 92. Unwanted intermodulation components and noise are rejected by image reject filter 94 to produce the composite signal $f_c$ on line 96. A high power amplifier 98 then sends this signal to an antenna 100, which serves as a means for broadcasting the composite signal. The composite broadcast signal is shown in FIG. 1.

The Forward Error Correction (FEC) technique used in the AM IBOC (In-Band On-Channel) DAB (Digital Audio Broadcast) system of this invention is referred to as Complementary Pattern-mapped Trellis-Coded Modulation (CPTCM). CPTCM coding is designed to be compatible with the host analog signal and to accommodate the likely interference scenarios encountered in the AM IBOC channel. One particular mode of operation is intended for a single stream (25.8 or 19.3 kbps) of digital audio that can be broadcast within a 20 kHz RF bandwidth. The 25.8 kbps mode has an optional Backup extension partition in the outer portions of the sidebands, expanding the bandwidth to 30 kHz while providing Lower/Upper/Main/Backup diversity. The 20 kHz RF bandwidth mode reduces interference and has no second-adjacent channel interference issues relative to the 30 kHz mode. However, digital coverage and robustness are reduced relative to the 30 kHz mode, since there are insufficient code bits to accommodate Main/Backup diversity. The CPTCM code technique partitions a "mother code" into smaller code partitions in a manner which is much better than random interleaving.

Functional block diagrams illustrating the assembly and partitioning of information bits is shown in FIGS. 3 and 4. FIG. 3 is a block diagram illustrating the functionality of forward error correction (FEC) and interleaving for a 20 or 30 kHz AM IBOC system. Data to be transmitted is received as indicated by arrow 101. Block 102 shows that the data is assembled into modem frames containing either 38,400 bits for rate 4/5 coding, or 28,800 bits for rate 3/5 coding. Block 104 shows that the data in each modem frame is divided into groups. For rate 4/5 coding, the groups have 8 bits, and for rate 3/5 coding, the groups have 6 bits. Forward error correction encoding and puncturing is then performed as shown in block 106. This produces 4800 10-bit outputs for both rates 4/5 and 3/5, and if the optional 30 kHz waveform is used, additional code bits at rate 4/5 for partitions XU and XL. The forward error corrected data is then assigned to partitions as illustrated by blocks 108, 110, 112, 114, 116 and 118. The numbers on the output arrows of block 106 represent the number of code bits mapped into the partitions for each puncture period.

The partitioned data is then mapped to the interleaver partitions. The data in partitions XU and XL is delayed as shown by blocks 120 and 122 to provide time diversity. The complementary feature of the FEC code is not present with the 20 kHz modes since the code rate is greater than R=½. However, the complementary feature is always used for the IBOC Data Service (IDS) subcarriers. The mother code is partitioned into a pair of complementary codes. For example a rate 1/3 code can be partitioned into a pair of good rate 2/3 codes, where each rate 2/3 code is designed to have good similar properties. Conversely if the r=1/3 code is randomly partitioned by an interleaver, then the resulting r=2/3 codes will likely be poor and catastrophic.

Two code rates are provided to allow a tradeoff between higher throughput (FEC rate 4/5 yields 25.8 kbps) or greater coverage (FEC rate 3/5 yields 19.3 kbps). The extended 30 kHz version of the R=4/5 code results in a R=2/5 code after code combining at the receiver to provide all the properties of the CPTCM technique with Lower/Upper/Main/Backup digital diversity. The 20 kHz version of the R=4/5 code provides the Main channel only and employs time diversity with the analog signal. The modulation and interleaving for the two rates are identical, although the information rates and code puncture patterns differ. In the absence of interference issues, a broadcaster would choose the 30 kHz option using the XL and XU partitions yielding coding gain and Backup diversity. However if a first or second adjacent signal would be affected in its coverage area, then that particular XL or XU sideband may be suppressed to avoid interference. A 20 kHz signal would result when both XL and XU are suppressed. Although the 20 kHz signal inflicts much lower interference, its coverage is less.

FIG. 4 is a block diagram illustrating the functionality of an IBOC data service (IDS) channel FEC and interleaving for 20 or 30 kHz AM IBOC system. Data to be transmitted in the data service channel is received as indicated by arrow 130. Block 132 shows that the data is assembled into an IDS block of 80 bits. Block 134 shows that the data in each IDS block is divided into 4-bit groups. Forward error correction encoding and puncturing is then performed as shown in block 136. This produces 12-bit outputs. The forward error corrected data is assigned to the upper and lower IDS subcarriers as illustrated by blocks 138 and 140. The data is then mapped to the IDS interleaver partitions.

The CPTCM technique is applied to Quadrature Amplitude Modulated (QAM) symbols by treating the I and Q components as independently coded Amplitude Shift Keying (ASK) signals. Specifically the 16-QAM symbol is created by modulating the I or Q component with independent 4-ASK signals. The 4-ASK symbols are generated from specially selected 2-bit groups which are then used to address the Gray-mapped constellation points. The mapping of the code bit pairs to the 4 levels of the 4-ASK symbols is presented in Table 1. The Quadrature Phase Shift Keying (QPSK) modulation is conventional assuming Binary Phase Shift Keying (BPSK) in each of the two dimensions.

TABLE 1

Mapping of CPTCM-coded bits to 4 levels of the 4-ASK symbols (for each 16-QAM dimension).

| MAPPING | Level −1.5 | Level −0.5 | Level +0.5 | Level +1.5 |
|---|---|---|---|---|
| A = MSB | 0 | 0 | 1 | 1 |
| B = LSB | 0 | 1 | 1 | 0 |

A/B indicate MSB/LSB only, and are not Partitions

The FEC code and interleaver are designed for CPTCM with a nominal 25 or 19 kbps single stream audio codec. The interleaved symbols are mapped onto a group of 30 QPSK complementary subcarrier pairs in the 0 to ±6 kHz region, 5 16-QAM complementary subcarrier pairs in the 6 to 7 kHz and −6 to −7 kHz regions, and 15 16-QAM noncomplementary subcarriers in each of the 7 to 10 kHz and −7 to −10 kHz regions. An optional 25 subcarriers are transmitted in each of the 10 to 15 kHz and −10 to −15 kHz regions for the optional 30 kHz R=4/5 partitions. The partition code bits that are mapped onto these subcarriers are defined below. The QPSK subcarriers are complementary, meaning that the lower QPSK group is modulated as the mirror image (negative complex conjugate) of the Upper QPSK group. Furthermore, the inner 10 16-QAM subcarriers in the 6 to 7 kHz and −6 to −7 kHz regions are complementary, while the remaining outer 16-QAM subcarriers are independent (non-complementary). Two additional outer subcarriers located at about ±9.45 kHz are used for IDS information. FIG. 1 illustrates the placement of these subcarriers within the 20 kHz (or optional extended 30 kHz) bandwidth.

The CPTCM code is created through puncturing of a rate 1/3 convolutional code. The FEC code requires appropriate puncture patterns and code-bit mapping to provide good results. The puncture pattern assigns code bits for the groups of subcarrier partitions. The combined puncture patterns for the partitions of the FEC codes for the two rates of the Main Program Audio (MPA) information is defined in Tables 2a and 2b. The subscripts in Tables 2a and 2b represent the code bits in the partition. Subscripts are used because there may be more than one code bit. For example, there is only one B bit, but there are three C bits.

TABLE 2a

Puncture pattern bit assignments for R = 4/5 FEC code (R = 2/5 w/Backup).

| $C_0$ | 0 | $AU_0$ | $XU_3$ | $C_1$ | 0 | $AL_2$ | $XL_3$ |
| $AL_0$ | $XL_1$ | 0 | $AL_1$ | $AU_1$ | $XU_1$ | 0 | $AU_2$ |
| $XL_0$ | B | $XL_2$ | $XL_4$ | $XU_0$ | $C_2$ | $XU_2$ | $XU_4$ |

The FEC 20 kHz Main (A,B,C) Puncture Pattern using convolutional code generator G=[G1=561o, G2=753o, G3=711o] (where o denotes octal notation) has a Hamming free distance of $d_f$=5 and the number of paths at that distance is a=4. The B and C partitions are complementary modulated (not to be confused with complementary code) meaning that the lower subcarrier is the negative complex conjugate of the corresponding upper subcarrier. Therefore the upper and lower groups of subcarriers are not independent. The 30 kHz Backup (X) Puncture Pattern has $d_f$=5 and a=7. The Composite R=2/5 Puncture Pattern has $d_f$=12 and a=2.

TABLE 2b

Puncture pattern bit assignments for R = 3/5 FEC code.

| $AL_0$ | $AU_0$ | $AL_1$ | $AU_1$ | $AL_2$ | $AU_2$ |
| $C_0$ | B | 0 | $C_1$ | $C_2$ | 0 |
| 0 | 0 | 0 | 0 | 0 | 0 |

The FEC Composite Puncture Pattern using G=[G1=561o, G2=753o, G3=711o] has $d_f$=8 and a=1.

The IDS subcarriers are modulated using 16-QAM symbols. Subcarriers −52 and +52 are the IDS subcarriers. The IDS Sequence is 32 symbols long (symbols 0 through 31) and associated with a block length. Symbols transmitted on subcarriers at locations 11 and 27 are assigned as Training Symbols. The remaining 30 symbols carry 120 code bits of rate 2/3 coded information. Hence each IDS Sequence carries 80 information bits, including an 8-bit CRC. A rate 1/3 code is employed with rate 2/3 complementary components. The combined puncture patterns for the partitions of the FEC codes for the IDS information is defined in Table 3.

TABLE 3

Puncture pattern bit assignments for
IDS Lower and Upper subcarriers.

| $L_0$ | $U_4$ | $L_4$ | $U_0$ |
| $L_2$ | $U_3$ | $L_3$ | $U_2$ |
| $U_1$ | $L_1$ | $U_5$ | $L_5$ |

The IDS FEC Composite Puncture Pattern using G=[G1=561o, G2=753o, G3=711o] has $d_f$=17 and a=3. For either the Lower or Upper IDS partition the IDS FEC Puncture Pattern has $d_f$=7 and a=6.

The interleavers for the Single Stream Main Program Audio (MPA) span an entire Modem Frame consisting of 256 COFDM symbols (bauds). The IDS interleavers span one block of 32 COFDM symbols, where there are 8 blocks in a Modem Frame.

The interleaving for the MPA code bits is separated into 6 non-overlapping partitions. The Partition C spans 30 complementary QPSK subcarrier pairs 2 through 31 and −2 through −31. The Partition B spans 5 complementary 16-QAM subcarrier pairs 32 through 36 and −32 through −36. The Partition AU spans 15 non-complementary 16-QAM subcarriers 37 through 51. The Partition AL spans 15 non-complementary QPSK subcarriers −37 through −51. The optional 30 kHz Partition XU spans 25 non-complementary 16-QAM subcarriers 57 through 81. The optional 30 kHz Partition XL spans 25 non-complementary QPSK subcarriers −57 through −81. The IDS is split between two Partitions IDSL and IDSU mapped to subcarriers −52 and +52. The MPA interleaver expressions span the entire Modem Frame of 256 OFDM symbols (Block of 32 symbols for IDS), while the span over the number of subcarriers is dependent on the size of the partition. For example, the code bits are mapped over the subcarriers in a partition, that is, the code bits span the partition.

The MPA interleaving is performed after gathering one Modem Frame of MPA data. The data in one embodiment consists of 38400 bits for the Rate 4/5 mode, or 28800 bits for the rate 3/5 mode. The data is then coded, punctured, and grouped into partitions AL, AU, B and C for subsequent interleaving. The partition bits within each puncture pattern are ordered as indicated, then stacked over the multiple puncture patterns comprising the Modem Frame. The ordering of the code bits within each partition ensures that the code bits are mapped to the particular QAM or QPSK symbol bits per the interleaver expressions.

The 80 IDS information bits comprising each Block are coded and assembled in groups of bits from the puncture patterns. The groupings within each partition are mapped using the interleaver expressions presented in Table 4.

In Table 4, the value of n indicates the particular ordered code bit (one of N bits) within each partition. The index k is computed from n, and points to one of the symbol locations within the Modem Frame (or Block for the IDS) identifying the row and column within the partition. Each of the 16-QAM symbols carries 4 code bits, while each QPSK symbol carries 2 bits. The value of p in the interleaver expression indicates the particular bit within each symbol (i.e., I or Q, and MSB or LSB where applicable).

TABLE 4

Interleaver Mapping for all Partitions.

| Partition | Index k | Row & column locations for symbol k | P code bit in symbol |
|---|---|---|---|
| $AU_{k,p}$<br>N = 14400 | k = mod[n + floor(n/3600), 3600]<br>n = 0 ... N − 1 | $rowA(k) = mod\left(5 + 109 \cdot k + 11 \cdot floor\left(\frac{7 \cdot k}{15}\right) + 111 \cdot floor\left(\frac{k}{240}\right), 256\right)$<br>colA(k) = mod(7·k, 15) ; k = 0 ... 3599,<br>Training symbols at locations k = 3600 ... 3839 | p = mod(n, 4) |
| $AL_{k,p}$<br>N = 14400 | k = mod[n + floor(n/3600), 3600]<br>n = 0 ... N − 1 | $rowA(k) = mod\left(5 + 109 \cdot k + 11 \cdot floor\left(\frac{7 \cdot k}{15}\right) + 111 \cdot floor\left(\frac{k}{240}\right), 256\right)$<br>colA(k) = mod(7·k, 15) ; k = 0 ... 3599,<br>Training symbols at locations k = 3600 ... 3839 | p = mod(n, 4) |
| $B_{k,p}$<br>N = 4800 | k = mod[n + floor(n/1200), 1200]<br>n = 0 ... N − 1 | $rowB(k) = mod\left(14 + 102 \cdot k + 25 \cdot floor\left(\frac{2 \cdot k}{5}\right) + 111 \cdot floor\left(\frac{k}{80}\right), 256\right)$<br>colB(k) = mod(2·k, 15) ; k = 0 ... 1199,<br>Training symbols at locations k = 1200 ... 1279 | p = mod(n, 4) |
| $C_{k,p}$<br>N = 14400 | k = mod[n + floor(n/7200), 7200]<br>n = 0 ... N − 1 | $rowC(k) = mod\left(4 + 97 \cdot k + 6 \cdot floor\left(\frac{19 \cdot k}{30}\right) + 111 \cdot floor\left(\frac{k}{480}\right), 256\right)$<br>colC(k) = mod(19·k, 30) ; k = 0 ... 7199,<br>Training symbols at locations k = 7200 ... 7679 | p = mod(n, 2) |
| $IDSU_{k,p}$<br>N = 120 | k = mod[n + floor(n/60), 30]<br>n = 0 ... N − 1 | rowIDS(k) = mod(5 + 9 · k, 32)<br>colIDS(k) = 0; k = 0 ... 29,<br>Training symbols at locations 11 and 27 | p = mod(n, 4) |
| $IDSL_{k,p}$<br>N = 120 | k = mod[n + floor(n/60), 30]<br>n = 0 ... N − 1 | rowIDS(k) = mod(5 + 9 · k, 32)<br>colIDS(k) = 0; k = 0 ... 29,<br>Training symbols at locations 11 and 27 | p = mod(n, 4) |

TABLE 4-continued

Interleaver Mapping for all Partitions.

| Partition | Index k | Row & column locations for symbol k | P code bit in symbol |
|---|---|---|---|
| $XU_{k,p}$ optional N = 24000 | k = mod[n + floor(n/6000), 6000] n = 0 ... N − 1 | rowA(k) = mod$\left(1 + 99 \cdot k + 29 \cdot \text{floor}\left(\frac{9 \cdot k}{25}\right) + 111 \cdot \text{floor}\left(\frac{k}{400}\right), 256\right)$ <br> colA(k) = mod(9·k, 25) ;  k = 0 ... 5999, <br> Training symbols at locations k = 6000 ... 6399 | p = mod(n, 4) |
| $XL_{k,p}$ optional N = 24000 | k = mod[n + floor(n/6000), 6000] n = 0 ... N − 1 | rowA(k) = mod$\left(1 + 99 \cdot k + 29 \cdot \text{floor}\left(\frac{9 \cdot k}{25}\right) + 111 \cdot \text{floor}\left(\frac{k}{400}\right), 256\right)$ <br> colA(k) = mod(9·k, 25) ;  k = 0 ... 5999, <br> Training symbols at locations k = 6000 ... 6399 | p = mod(n, 4) |

The Interleaver Indices are: k=Modem Frame Symbol Index for MPA Partitions, or Block Symbol Index for IDS Partitions; and p=16-QAM code bit mapping within each 16-QAM symbol, (IMSB=0, ILSB=1, QMSB=2, QLSB=3), or QPSK code bit mapping within each QPSK symbol, (I=0, Q=1), where I/Q=In phase/Quadrature, MSB or LSB of Gray-coded 4ASK symbols.

Figure 5:
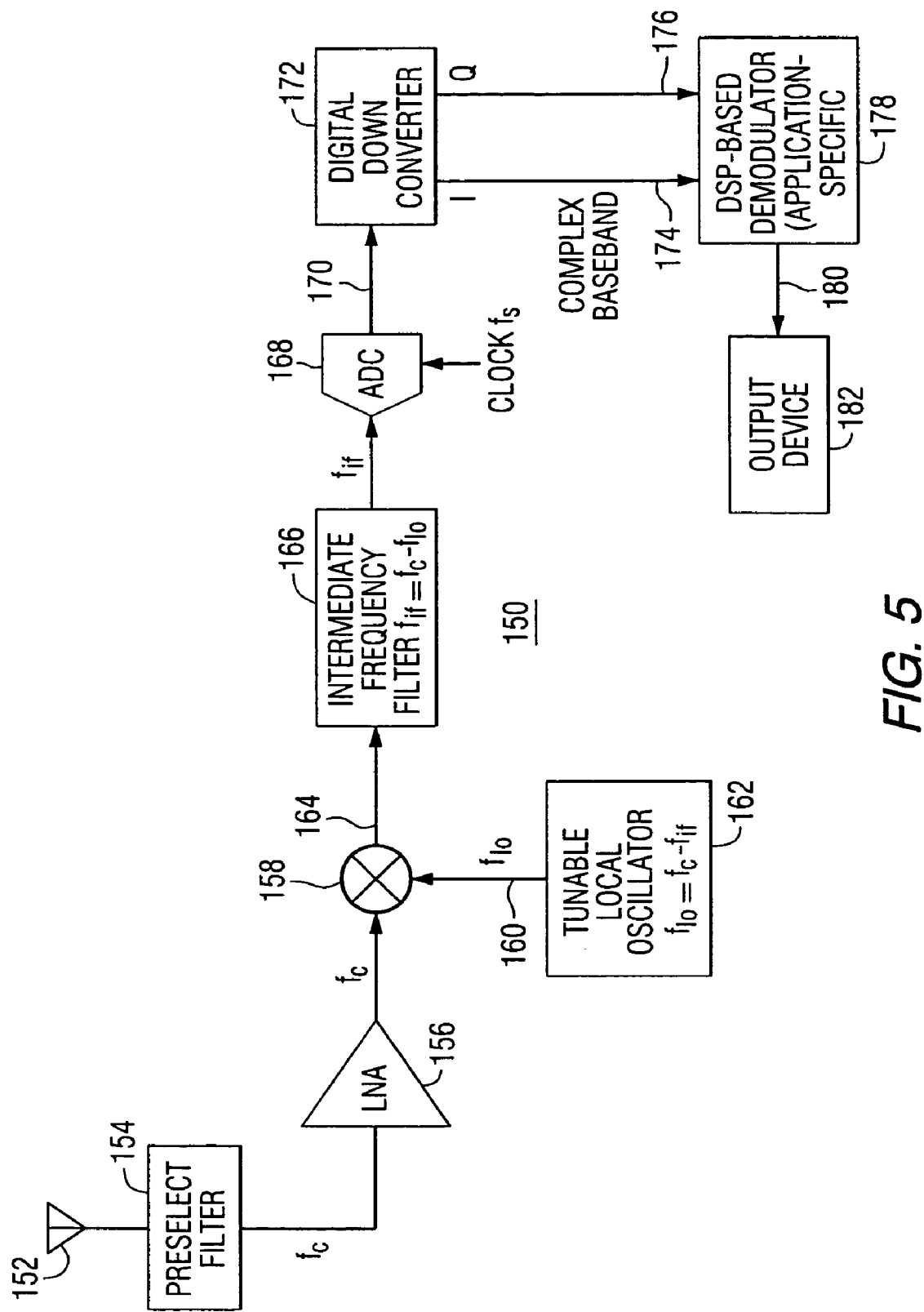
FIG. 5 is a functional block diagram of an AM IBOC DAB receiver constructed in accordance with this invention.

FIG. 5 is a block diagram of a radio receiver 150 constructed in accordance with this invention. The DAB signal is received on antenna 152. A bandpass preselect filter 154 passes the frequency band of interest, including the desired signal at frequency $f_c$, but rejects the image signal at $(f_c - 2f_{if})$, for a low side lobe injection local oscillator. Low noise amplifier 156 amplifies the signal. The amplified signal is mixed in mixer 158 with a local oscillator signal $f_{lo}$ supplied on line 160 by a tunable local oscillator 162. This creates sum $(f_c + f_{lo})$ and difference $(f_c − f_{lo})$ signals on line 164. Intermediate frequency filter 166 passes the intermediate frequency signal $f_{if}$ and attenuates frequencies outside of the bandwidth of the modulated signal of interest. An analog-to-digital converter 168 operates using a clock signal $f_s$, to produce digital samples on line 170 at a rate $f_s$. Digital down converter 172 frequency shifts, filters and decimates the signal to produce lower sample rate in-phase and quadrature signals on lines 174 and 176. A digital signal processor based demodulator 178 then provides additional signal processing to produce an output signal on line 180 for output device 182.

A functional block diagram of the deinterleaver 190 and FEC decoder portions of a receiver are shown in FIGS. 6 and 7. The constellation data at the input on line 192 includes the I and Q values for each of the QAM or QPSK symbols, which have been demodulated and normalized to the constellation grid. Channel State Information (CSI) is associated with each I and Q value to permit subsequent soft-decision detection of the code bits. The Partitions AU, AL, B and C (and optionally XU and XL) are accumulated in an entire Modem Frame prior to deinterleaving, as shown in block 194. The deinterleaving and depuncturing are the reverse of operations performed in the transmitter. Block 196 shows that soft decision code bits are produced for the signals transmitted in the central ±20 kHz band and for the extended upper and lower sidebands if used. The various partitions are deinterleaved as shown in blocks 198, 200, 202, 204, 206 and 208. The deinterleaved bits for partitions AU, AL, B and C are delayed as shown in blocks 210, 212, 214 and 216. FEC decoding of the main program audio is then performed as shown in block 218 to produce MPA packets on line 220.

FIG. 7 is a block diagram of the IDS decoding. The IDS signal is input on line 222 and the assembled constellation data and channel state information are assembled as shown in block 224. Soft decisions are generated as shown in block 226, which are subsequently deinterleaved as shown in block 228. The resulting IDSL and IDSU signals are then FEC decoded as illustrated by block 230 to produce IDS packets on line 232. The IDS functions are processed on interleaver Block boundaries (as opposed to Modem Frame boundaries) in order to minimize delay in processing the IDS data.

Since binary codes are used for CPTCM, it is necessary to obtain soft binary metrics from noisy M-ary symbols. Suppose that the received noise symbol is:

$$y_i = s_i + n_i, \; i=1, \ldots N$$

Assuming K information bits per symbol, the binary metric for the k-th bit is given by:

$$\lambda_{i,k} = \ln\frac{Pr(b_k = 1 \mid y_i)}{Pr(b_k = 0 \mid y_i)} = \ln\frac{\sum_{all \; s_j^{1,k}} f_n(y_i - s_j^{1,k})}{\sum_{all \; s_j^{0,k}} f_n(y_i - s_j^{0,k})}, \; k = 1, \ldots, K$$

where $s_j^{1,k}$ stands for the j-th symbol in the constellation that has bit value 1 in the k-th bit position (and similarly for $s_j^{0,k}$ the j-th symbol in the constellation that has bit value 0 in the k-th bit), and $$f_n(x) = \frac{1}{\sqrt{2\pi\sigma^2}} \exp\left[-\frac{x^2}{2\sigma^2}\right]$$

is the probability density function of noise, assuming AWG noise. The above formula for the soft bit metric applies for any constellation. The main disadvantage of this approach is that it requires computations of exponentials. An approximate metric can be obtained by approximating the sum of exponentials by the maximum exponential, so that:

$$\lambda_{i,k} \cong \ln \frac{\max_{all\ s_j^{1,k}} \exp\left[-\frac{1}{2\sigma_i^2}(y_i - s_j^{1,k})^2\right]}{\max_{all\ s_j^{0,k}} \exp\left[-\frac{1}{2\sigma_i^2}(y_i - s_j^{0,k})^2\right]}, k = 1, \ldots, K$$

$$\cong \frac{1}{\sigma_i^2}[y_i(s^{1,k}\min - s^{0,k}\min) - 0.5(s^{1,k}\min^2 - s^{0,k}\min^2)]$$

where irrelevant terms and constants are dropped and $s^{1,k}$ denotes the symbol closest to $y_i$ that has 1 in the k-th bit position (and similarly for $s_{0,k}$ min). Thus, by means of this approximation (the so called log-max approximation) the calculation of exponentials is avoided. However a fraction of dB can be lost in performance as a consequence of using this approximation.

Figure 8:
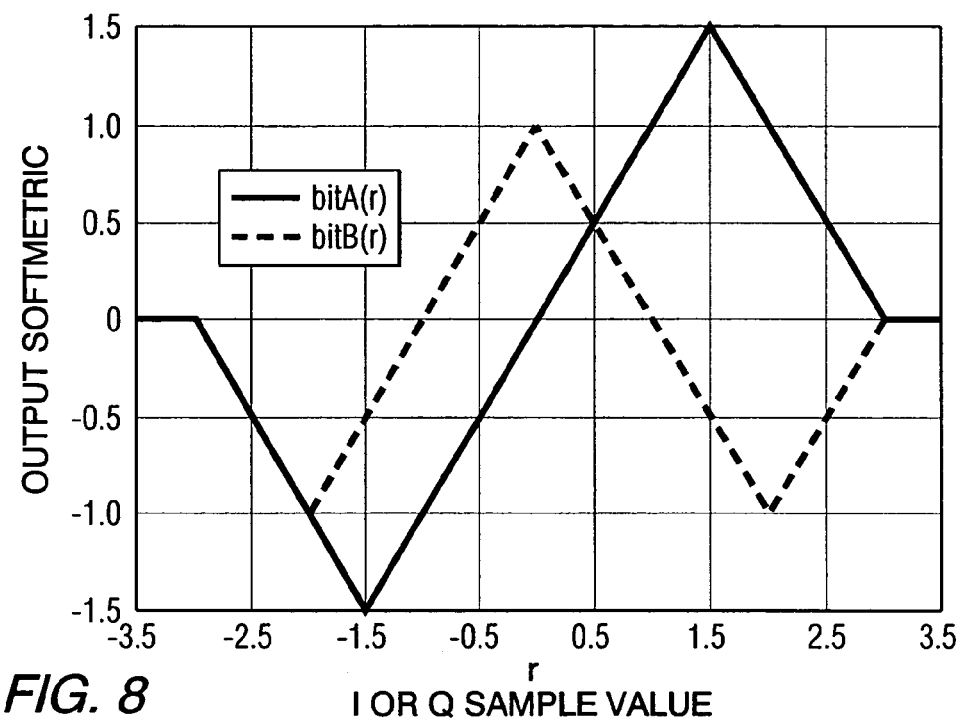
FIG. 8 is a diagram of a robust soft metric F(y) for 4-ASK (I or Q component of 16-QAM).
Figure 9:
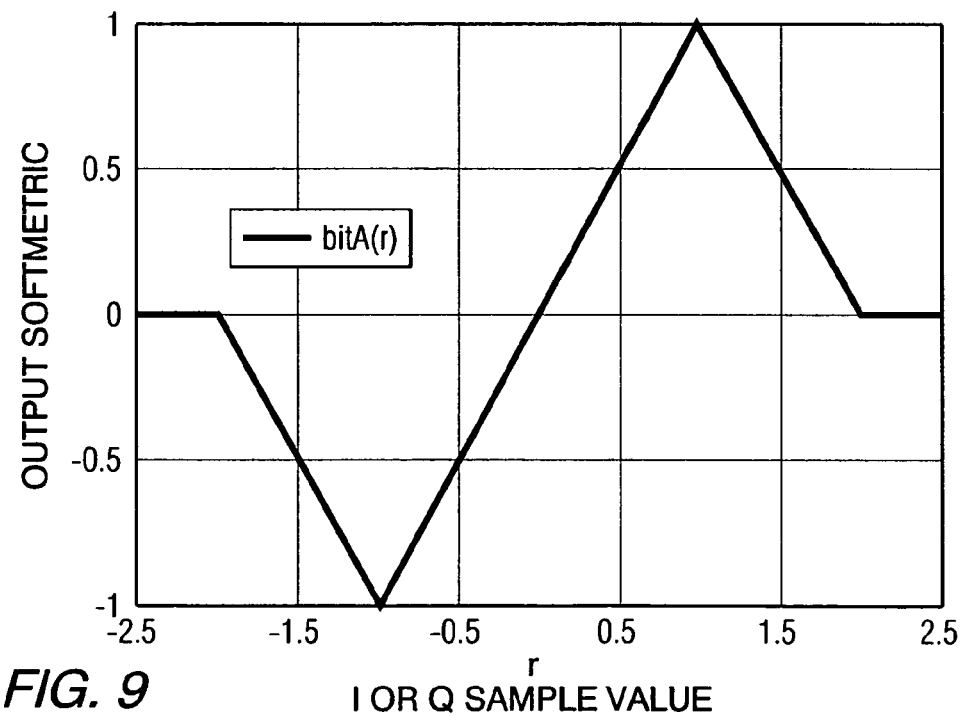
FIG. 9 is a diagram of a robust soft metric F(y) for BPSK (I or Q component of QPSK).

Next consider possible improvements of soft metric for the impulsive noise scenario. Assume that the noisy symbol sample is passed through a nonlinearity in the form of a soft limiter or linear clipper. It is desired to construct a soft metric that performs approximately the same in Average White Gaussian Noise (AWGN) as previously considered metrics, yet that will have smaller degradation in impulsive noise. That is, it has to have enough "softness" to maximize the performance in AWGN and to limit metric samples when impulsive noise is present, i.e. to prevent the excessive metric growth when large noise samples are present. FIGS. 8 and 9 illustrate nonlinearities for 4-ASK and QPSK, respectively.

Based on the value of received noisy signal, soft metrics can be constructed by passing the received sample through different nonlinearities shown in FIGS. 8 and 9. The constructed soft bit values are further divided by the corresponding values of average noise power estimated for the symbol. In summary, the soft metric can be represented by:

$$\text{soft\_out}_i = \frac{F(y_i)}{\sigma_i^2}$$

where y represents the received noisy symbol and F(.) is the desired nonlinearity from FIGS. 8 and 9.

The performance of surviving partitions under various interference scenarios is set forth in Table 5.

TABLE 5

Performance of surviving partitions with interference

| PARTITIONS (surviving) | Hamming Free Distance error-correcting property | Scenario |
|---|---|---|
| AL + AU + B + C + XL + XU (full 30 kHz option XL + XU) | 12 | All partitions (30 kHz) Full time diversity No large interferers |
| AL + AU + B + C + XL (full 25 kHz optional XL) | 8 | Eliminate XU |
| AL + AU + B + C + XU (full 25 kHz optional XU) | 8 | Eliminate XL |
| AL + AU + B + C (full 20 kHz option) | 5 | Main, Or corrupted Backup XL, XU |
| AL + AU + XL + XU | 9 | Co-channel Interferer B & C corrupted |

TABLE 5-continued

Performance of surviving partitions with interference

| PARTITIONS (surviving) | Hamming Free Distance error-correcting property | Scenario |
|---|---|---|
| XL + XU | 5 | Backup time diverse, main corrupted |
| AU + B + C + XU | 6 | Lower + center (B + C) AL, XL corrupted, Moderate Lower First adjacent interferer |
| AL + B + C + XL | 6 | Upper + center (B + C) AU, XU corrupted, Moderate Upper First adjacent interferer |
| AU + B + XU | 4 | Large Lower first adjacent interferer, or Lower second with XU |
| AL + B + XL | 3 | Large Upper first adjacent interferer, or Upper second with XL |
| AU + XU | 1 | Co-channel and Lower first and second adjacent interferers |
| AL + XL | 1 | Co-channel and Upper first and second adjacent interferers |

The bits in the AU, AL, and the XU and XL partitions are true complementary pairs, whereas the B and C partitions are extra code bits to improve coding gain. True complementary implies that one partition (e.g. AU) is a cyclic shift of the code bits of another partition (e.g. AL), and that these partitions (component codes) are good noncatastrophic codes by themselves having identical code properties. When the complementary partitions are combined, they form a code that is generally better than the sum of the two. In the method of this invention, the restriction that these codes be a cyclic shift of each other with identical properties is not necessary.

This invention reduces adjacent channel interference relative to the previous AM Hybrid system. It also introduces lower crosstalk to its analog AM host signal since the C partition spans about ±6 kHz at −50 dBc/subcarrier, whereas previous design spans ±5 kHz and the 5 to 6 kHz range is −43 dBc/subcarrier. In other words it is more compatible in the AM environment.

An important feature of this code is the flexibility of the design such that either of the optional XU or XL partitions can be eliminated or suppressed to reduce adjacent channel interference. When one partition is eliminated (e.g. XU), then the signal occupies approximately 25 kHz. When both are eliminated the BW is 20 kHz. This is an important flexibility feature of the code to accommodate the adjacent channel assignments for a particular AM station. These features are preferred over creating new code designs for 20, 25 and 30 kHz options. Another feature of this signal is that the outer partitions XU and XL (when present) are reduced by 10 dB in power relative to the previous Hybrid design.

The B and C partitions are extra partitions in addition to the complementary partitions which provide additional coding gain in some interference scenarios.

While the present invention has been described in terms of particular embodiments, it will be apparent to those skilled in the art that various changes can be made to the disclosed embodiments without departing from the scope of the invention as set forth in the following claims.

What is claimed is:

1. A receiver for receiving an AM compatible digital audio broadcasting signal, the receiver comprising:
    an antenna for receiving a composite signal comprising an analog modulated carrier signal centrally positioned in a radio channel, wherein the analog modulated carrier signal is modulated by an analog signal, and a plurality of digitally modulated subcarrier signals in the radio channel, wherein the digitally modulated subcarrier signals are modulated using complementary pattern-mapped trellis code modulation including a code mapped to overlapping partitions; and
    means for producing an output in response to the composite signal;
    wherein in a first operating mode the analog modulated carrier signal and the plurality of digitally modulated subcarrier signals are in a 20 kHz channel and the analog modulated signal is delayed with respect to the plurality of digitally modulated subcarrier sianals, and in a second operating mode the analog modulated carrier signal and the plurality of digitally modulated subcarrier signals are in a 30 kHz channel and a first group of the plurality of digitally modulated subcarrier signals are delayed with respect to a second group of the plurality of digitally modulated subcarrier signals.

2. The receiver of claim 1, wherein the code comprises: a complementary punctured convolutional code.

3. The receiver of claim 1, wherein:
    the composite signal and the data service signal are processed on interleaver block boundaries.

4. A method of broadcasting an AM compatible digital audio broadcasting signal, the method comprising the steps of:
    producing an analog modulated carrier signal centrally positioned in a radio channel, wherein the analog modulated carrier signal is modulated by an analog signal;
    producing a plurality of digitally modulated subcarrier signals in the radio channel, wherein the digitally modulated subcarrier signals are modulated using complementary pattern-mapped trellis code modulation (CPTCM) including a code mapped to overlapping partitions; and
    transmitting the analog modulated carrier signal and the plurality of digitally modulated subcarrier signals;
    wherein in a first operating mode the analog modulated carrier signal and the plurality of digitally modulated subcarrier signals are in a 20 kHz channel and the analog modulated signal is delayed with respect to the plurality of digitally modulated subcarrier signals, and in a second operating mode the analog modulated carrier signal and the plurality of digitally modulated subcarrier signals are in a 30 kHz channel and a first group of the plurality of digitally modulated subcarrier signals are delayed with respect to a second group of the plurality of digitally modulated subcarrier signals.

5. The method of claim 4, wherein the code comprises: a complementary punctured convolutional code.

6. A method of broadcasting an AM compatible digital audio broadcasting signal, the method comprising the steps of:
    producing an analog modulated carrier signal centrally positioned in a radio channel, wherein the analog modulated carrier signal is modulated by an analog signal:
    producing a plurality of digitally modulated subcarrier signals in the radio channel, wherein the digitally modulated subcarrier signals are modulated using complementary pattern-mapped trellis code modulation (CPTCM) including a code mapped to overlapping partitions; and
    transmitting the analog modulated carrier signal and the plurality of digitally modulated subcarrier signals;
    wherein the analog modulated carrier signal and the plurality of digitally modulated subcarrier signals are in a 30 kHz channel, the method further comprising the step of:
    eliminating or suppressing the subcarriers in an upper partition of subcarriers, or the subcarriers in a lower partition of subcarriers, or the subcarriers in both the upper partition of subcarriers and the lower partition of subcarriers depending upon interference conditions.

7. A receiver for receiving an AM compatible digital audio broadcasting signal, the receiver comprising:
    an antenna for receiving a composite signal comprising an analog modulated carrier signal centrally positioned in a radio channel, wherein the analog modulated carrier signal is modulated by an analog signal, and a plurality of digitally modulated subcarrier signals in the radio channel, wherein the digitally modulated subcarrier signals are modulated using complementary pattern-mapped trellis code modulation including a code mapped to overlapping partitions; and
    an output device for producing an output in response to the composite signal;
    wherein in a first operating mode the analog modulated carrier signal and the plurality of digitally modulated subcarrier signals are in a 20 kHz channel and the analog modulated signal is delayed with respect to the plurality of digitally modulated subcarrier signals, and in a second operating mode the analog modulated carrier signal and the plurality of digitally modulated subcarrier signals are in a 30 kHz channel and a first group of the plurality of digitally modulated subcarrier signals are delayed with respect to a second group of the plurality of digitally modulated subcarrier signals.

8. The receiver of claim 7, wherein the code comprises: a complementary punctured convolutional code.

9. The receiver of claim 7, wherein:
    the composite signal and the data service signal are processed on interleaver block boundaries.

10. A method of broadcasting an AM compatible digital audio broadcasting signal, the method comprising the steps of:
    producing an analog modulated carrier signal centrally positioned in a radio channel, wherein the analog modulated carrier signal is modulated by an analog signal;
    producing a first plurality of subcarrier signals in a first portion of the radio channel and a second plurality of subcarrier signals in a second portion of the radio channel, wherein the first and second pluralities of subcarrier signals are complementary modulated subcarrier signals and have a power spectral density below the analog modulated carrier by a first margin;

producing a third plurality of subcarrier signals in a third portion of the radio channel and a fourth plurality of subcarrier signals in a fourth portion of the radio channel, wherein the third and fourth pluralities of subcarrier signals are complementary modulated subcarrier signals and have a power spectral density below the analog modulated carrier by a second margin;

producing a fifth plurality of subcarrier signals in a fifth portion of the radio channel and a sixth plurality of subcarrier signals in a sixth portion of the radio channel, wherein the fifth and sixth pluralities of subcarrier signals have a power spectral density below the analog modulated carrier by a third margin;

wherein the first, second, third, fourth, fifth and sixth pluralities of subcarrier signals are modulated by one or more digital signals, the first margin is larger than the second margin, and the second margin is larger than the third margin; and transmitting the first, second, third, fourth, fifth and sixth pluralities of subcarrier signals.

11. The method of claim 10, wherein:

the digital signals are complementary pattern mapped signals.

12. The method of claim 10, wherein:

the first and second pluralities of subcarrier signals are QPSK modulated; and the third, fourth, fifth and sixth pluralities of subcarrier signals are 16-QAM modulated.

13. The method of claim 10, wherein:

the first portion of the radio channel encompasses frequencies between about 0 kHz and about +6 kHz from the analog modulated carrier;

the second portion of the radio channel encompasses frequencies between about 0 kHz and about −6 kHz from the analog modulated carrier;

the third portion of the radio channel encompasses frequencies between about +6 kHz and about +7 kHz from the analog modulated carrier;

the fourth portion of the radio channel encompasses frequencies between about −6 kHz and about −7 kHz from the analog modulated carrier;

the fifth portion of the radio channel encompasses frequencies between about +7 kHz and about +10 kHz from the analog modulated carrier; and the sixth portion of the radio channel encompasses frequencies between about −7 kHz and about −10 kHz from the analog modulated carrier.

14. The method of claim 10, further comprising the steps of:

producing a seventh plurality of subcarrier signals in a seventh portion of the radio channel and an eighth plurality of subcarrier signals in an eighth portion of the radio channel, wherein the seventh and eighth pluralities of subcarrier signals have a power spectral density at least 40 dBc below the analog modulated carrier;

wherein the seventh and eighth pluralities of subcarrier signals are modulated by the one or more digital signals; and transmitting the seventh and eighth pluralities of subcarrier signals.

15. The method of claim 14, wherein:

the digital signals are 25 kbps signals coded at a rate of 4/5.

16. The method of claim 14, wherein:

the seventh portion of the radio channel encompasses frequencies between about +10 kHz and about +15 kHz from the analog modulated carrier; and the eighth portion of the radio channel encompasses frequencies between about −10 kHz and about −15 kHz from the analog modulated carrier.

17. The method of claim 14, further comprising the step of:

eliminating or suppressing the seventh plurality of subcarriers, or the eighth plurality of subcarriers, or the seventh plurality of subcarriers and the eighth plurality of subcarriers depending upon interference conditions.

* * * * *

UNITED STATES PATENT AND TRADEMARK OFFICE
CERTIFICATE OF CORRECTION

| | |
|---|---|
| PATENT NO. | : 7,340,010 B2 |
| APPLICATION NO. | : 10/764629 |
| DATED | : March 4, 2008 |
| INVENTOR(S) | : Brian William Kroeger |

It is certified that error appears in the above-identified patent and that said Letters Patent is hereby corrected as shown below:

Column 9, Line 12
$d_f$-17 and a=3. should read $d_f$=17 and a=3.

Table 4
Line 53
colB(k) = mod(2•k, 15) should read colB(k) = mod(2•k, 5)

Column 13, Line 12
...dropped and $s^{1,k}$ denotes the symbol closest to $y_i$ that has 1 in the k-th bit position (and similarly for $s_{o,k}$ min).

should read

...dropped and $s^{1,k}_{min}$ denotes the symbol closest to $y_i$ that has 1 in the k-th bit position (and similarly for $s^{o,k}_{min}$).

Signed and Sealed this

Seventh Day of July, 2009

JOHN DOLL
*Acting Director of the United States Patent and Trademark Office*